United States Patent [19]

Sakakibara et al.

[11] Patent Number: 4,526,062

[45] Date of Patent: Jul. 2, 1985

[54] STEPLESS AUTOMATIC TRANSMISSION FOR MOTOR VEHICLES

[75] Inventors: Shiro Sakakibara, Toyokawa; Mutsumi Kawamoto, Nagoya, both of Japan

[73] Assignee: Aisin-Warner Kabushiki Kaisha, Anjo, Japan

[21] Appl. No.: 476,805

[22] Filed: Mar. 18, 1983

[51] Int. Cl.$^3$ ............... F16H 37/00; F16H 37/08
[52] U.S. Cl. ............................ 74/689; 74/695; 74/701
[58] Field of Search ............... 74/694, 695, 689, 701; 474/28

[56] References Cited

U.S. PATENT DOCUMENTS

| | | | |
|---|---|---|---|
| 4,317,389 | 3/1982 | Falzoni | 74/689 |
| 4,329,888 | 5/1982 | Falzoni | 74/695 X |
| 4,335,629 | 6/1982 | Falzoni | 74/695 X |
| 4,464,145 | 8/1984 | Kawamoto et al. | 474/28 |

FOREIGN PATENT DOCUMENTS

| | | | |
|---|---|---|---|
| 0063785 | 11/1982 | European Pat. Off. | 74/689 |
| 2557243 | 1/1976 | Fed. Rep. of Germany | 74/695 |
| 129953 | 8/1982 | Japan | 74/695 |
| 140956 | 8/1982 | Japan | 74/695 |
| 134059 | 8/1982 | Japan | 74/695 |
| 204362 | 12/1982 | Japan | 74/695 |

Primary Examiner—George H. Krizmanich
Assistant Examiner—Dirk Wright
Attorney, Agent, or Firm—Cooper, Dunham, Clark, Griffin & Moran

[57] ABSTRACT

A stepless or continuously variable automatic transmission for motor vehicle, including a first shaft coupled with the output shaft of the engine and rotatably supported by the transmission case consisting of a torque converter case accommodating a fluid joint, a transmission case fastened to the torque converter case and accommodating a V-belt type stepless transmission and a center case interposed between the torque converter and transmission cases; a second shaft disposed parallel with the first shaft and supported by the transmission case rotatably at three support points on the torque converter case, transmission case and center case; and a third shaft disposed parallel with the second shaft and rotatably supported by the transmission case, transmitting power from the first to second shaft by the V-belt type stepless transmission and from the second and third shaft by meshed engagement with a helical output gear mounted on the second shaft and a helical input gear mounted on the third shaft, the stepless automatic transmission being characterized in that: the second shaft is divided into an input section and an output section, and the helical output pulley is mounted between the support points on the torque converter and center and center cases through a roller bearing.

1 Claim, 2 Drawing Figures

STEPLESS AUTOMATIC TRANSMISSION FOR MOTOR VEHICLES

BACKGROUND OF THE INVENTION

1. Field of the Invention

This invention relates to a stepless or continuously variable automatic transmission to be mounted between an engine and a drive wheel axle of a motor vehicle.

2. Description of the Prior Art

The front-engine/front-drive type motor vehicles have come to employ a stepless automatic transmission which has its power transmission shaft divided into three parts as shown in FIG. 1 for the purpose of reducing its axial dimension from the standpoint of improving the mountability of the transmission. As seen in the figure, a first shaft 10 which is disposed coaxially with the engine output shaft is provided with an input pulley 52. A second shaft 20 which is disposed parallel with the first shaft is provided with an output pulley 56 and a helical output gear 59 at its output end, and, in order to ensure its rigidity, supported at three points by the transmission case including a torque converter case accommodating the fluid joint, a transmission case fastened to the torque converter case and a center case fastened in position between the torque converter and transmission cases. The third shaft is disposed parallel with the second shaft and provided with a speed-reducing idler gear. In such a conventional stepless automatic transmission, it is necessary to determine the relative axial positions of the input and output pulleys with a high degree of accuracy to ensure higher efficiency and durability of the belt. In the above-described case, a single ball bearing is employed to determine the axial positions of the pulleys and to support the large thrust force imposed by the helical gears, so that there have been problems that the ball bearing has a short service life and the bearings at the three supporting points are required to have a high degree of concentricity, necessitating simultaneous machining of the bearings to improve the accuracy of the machining operation. This is obviously reflected by low productivity and high production cost.

SUMMARY OF THE INVENTION

It is an object of the present invention to provide a stepless automatic transmission for motor vehicles, employing a second shaft which is divided into two sections and a roller bearing to support the thrust of the helical gears, thereby to improve the durability of the ball bearing and to lower the necessity for a high degree of concentricity of the bearings at the three supporting points, permitting fabrication of the transmission with an enhanced productivity and at a reduced cost.

According to the present invention, there is provided a stepless automatic transmission for motor vehicle, including: a first shaft coupled with the output shaft of the engine and rotatably supported by the transmission case consisting of a torque converter case accommodating a fluid joint, a transmission case fastened to the torque converter case and accommodating a V-belt type stepless transmission and a center case interposed between the torque converter and transmission cases; a second shaft disposed parallel with the first shaft and supported by the transmission case rotatably at three support points on the torque converter case, transmission case and center case; and a third shaft disposed parallel with the second shaft and rotatably supported by the transmission case, transmitting power from the first to second shaft by the V-belt type stepless transmission and from the second and third shaft by meshed engagement with a helical output gear mounted on the second shaft and a helical input gear mounted on the third shaft, the stepless automatic transmission being characterized in that: the second shaft is divided into an input section and an output section, and the helical output pulley is mounted between the support points on the torque converter and center cases and rotatably gripped between the torque converter and center cases through a roller bearing.

The above and other objects, features and advantages of the present invention will become apparent from the following description and appended claims, taken in conjunction with the accompanying drawings which illustrate by way of example one preferred embodiment of the invention.

DESCRIPTION OF PREFERRED EMBODIMENTS

Figure 1:
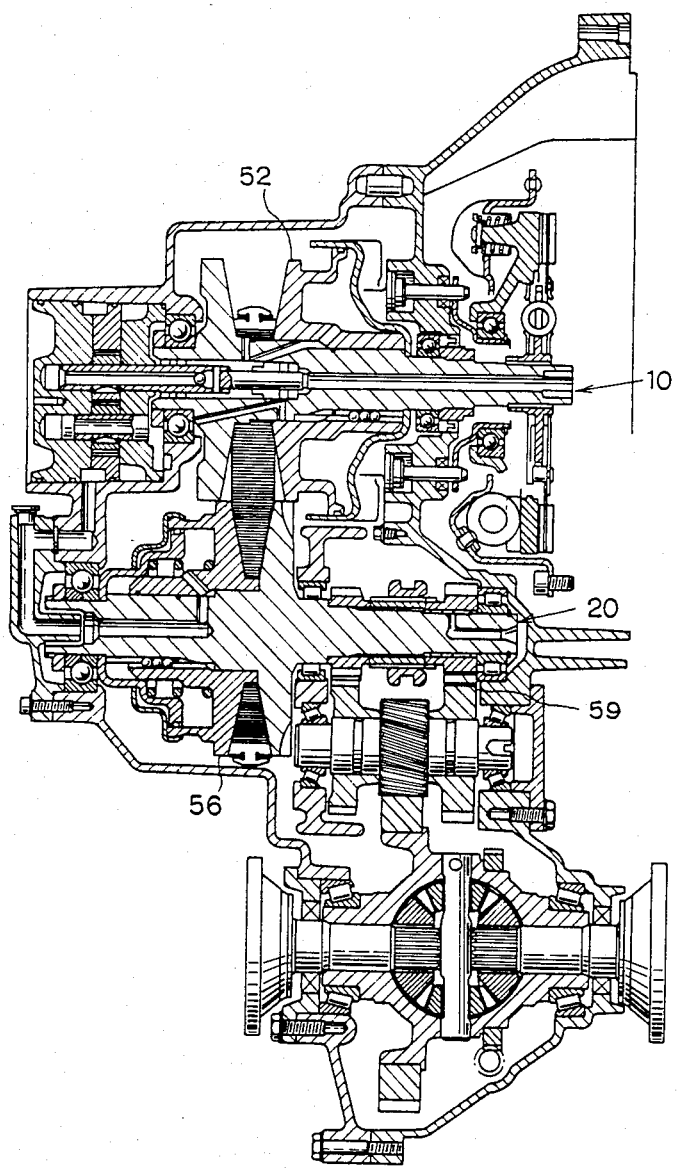
FIG. 1 is a diagrammatic sectional view of a conventional stepless automatic transmission for motor vehicle.
Figure 2:
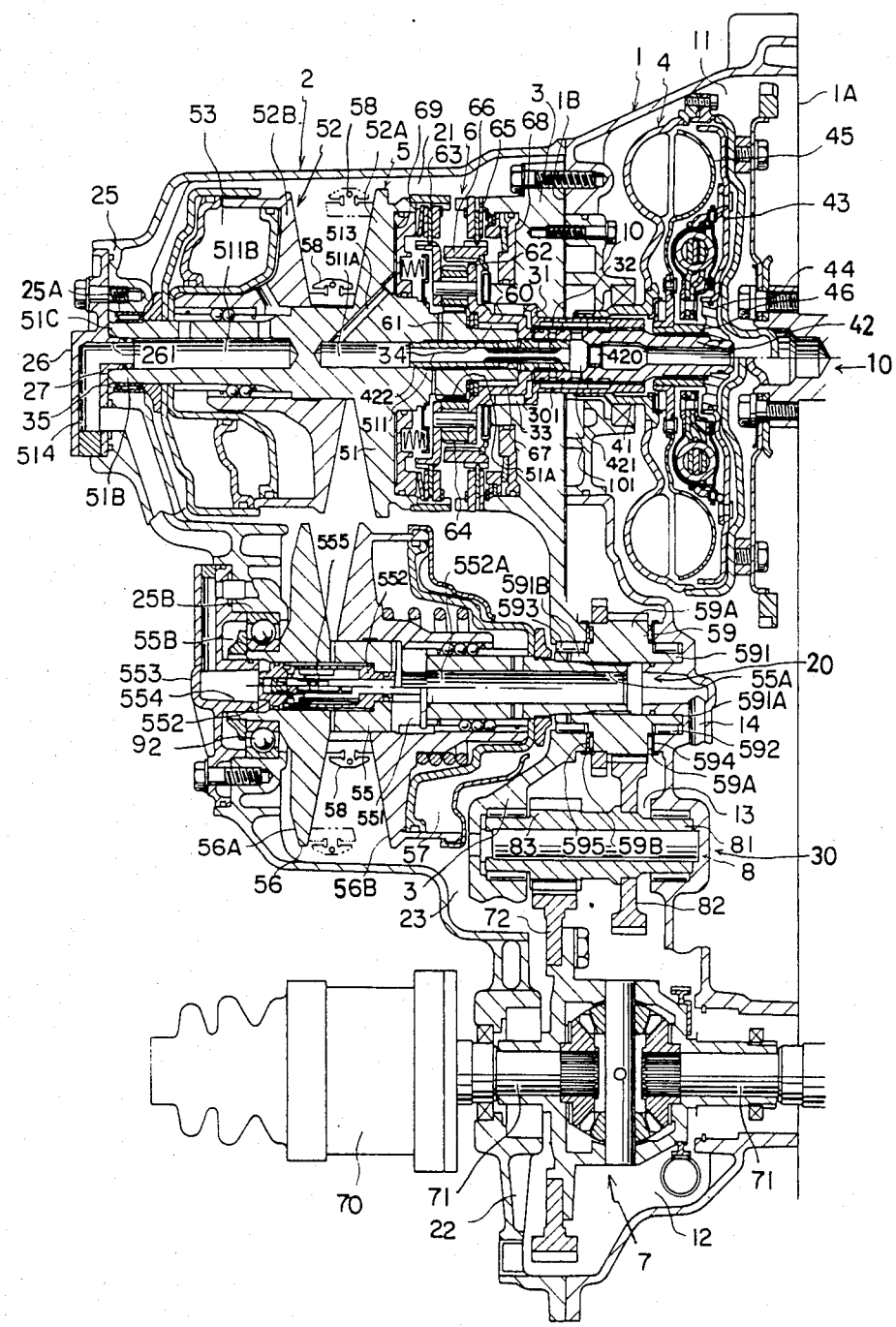
FIG. 2 is a view similar to FIG. 1 but showing a stepless automatic transmission according to the present invention.

Referring to FIG. 2, there is shown a stepless automatic transmission embodying the present invention, wherein indicated at 1 is a torque converter case defining a fluid joint room 11 having an open end face 1A fastened to the engine and accommodating a fluid joint such as fluid coupling and torque converter, a differential room 12 having an open end on the side remote from the engine and receiving therein a differential gear assembly while supporting one of the output shafts of the differential gear assembly, and an idler gear room 13 similarly having an open end on the side away from the engine and accommodating an idler gear assembly while supporting one of the idler gear shafts. Designated at 2 is a transmission case which is fastened to the end face 1B of the torque converter case 1 on the side away from the engine by means of bolts, and defines a transmission room 21 having an open end on the side of the engine 2 and accommodating a V-belt stepless transmission, a differential room 22 closing the open end of the differential room of the above-mentioned torque converter case and supporting the other output shaft of the differential gear assembly, and an idler gear room 23 closing the open end of the idler gear room 13 of the torque converter case on the side remote from the engine. The transmission case constitutes the outer shell (casing) of the automatic transmission along with the torque converter case and an intermediate case which will be described hereafter. The intermediate case denoted at 3 journals thereon a transmission shaft which is provided between the fluid joint and the transmission, and, in the particularly embodiment shown, it is accommodated in the transmission case to constitute a center case fastened by means of bolts to the end face 1B of the torque converter case on the side away from the engine by means of bolts. The center case may be fastened to the transmission case alone or both of the transmission case and torque converter case. In the particular embodiment shown, the automatic transmission consists of a fluid coupling of a known construction which is received in the torque converter case 1 and coupled with the engine output shaft, and a transmission which is provided in the transmission case. The transmission includes a hollow input shaft 51 which is disposed coaxially with the fluid coupling 4 and defines a lubricant oil feed conduit 511 axially through its hollow cavity, a V-belt type stepless transmission 5 having an output shaft 55 disposed parallel with the input shaft 51 and an oil conduit 551 formed internally through the output shaft 55, a reducing planetary gear system 6 provided between the input shaft 51 of the V-belt type stepless transmission and the output shaft of the fluid coupling, a differential gear assembly 7 having an output shaft 71 disposed parallel with the input and output shafts 51 and 55 of the V-belt stepless transmission 5 and coupled with a wheel axle 70, and an idler gear assembly 8 including an idler gear shaft 81 interposed between a large input gear 72 of the differential gear assembly 8 and the output gear 59 mounted on the output shaft 55 of the V-belt stepless transmission at the end on the side of the engine and output gears 82 and 83 mounted on the idler gear shaft 81.

In the embodiment shown, the first power transmission shaft 10 is constituted by the output shaft 42 of the fluid coupling, the input and output shafts 60 and 61 of the reducing planetary gear mechanism 6 and the input shaft 51 of the V-belt stepless transmission, the second shaft 20 is constituted by the output shaft 52 and output gear 59 of the V-belt stepless transmission, and the third shaft 30 is constituted by the idler gear shaft 81.

The V-belt stepless transmission 5 and the reducing planetary gear mechanism 6 are controlled by a hydraulic control system in the known manner to establish a suitable reduction ratio and a forward or reverse range according to the vehicle speed, throttle opening or other operating conditions of the vehicle. Indicated at 100 is an oil pump cover which is securely fastened to the wall of the center case on the side of the engine (or on the side of the fluid coupling), accommodating therein an oil pump 101 driven by a hollow shaft 41 which is formed integrally with the fluid coupling 4.

The output shaft 42 of the fluid coupling 4 is rotatably supported through a metal bearing 32 in a sleeve 31 which is fitted at the center of the intermediate case 3, and has a hub 44 of a lock-up clutch 43 and a hub 46 of a turbine 45 of the fluid coupling splined at the end on the side of the engine. The other end of the output shaft 42 which is enlarged stepwise in diameter constitutes an input shaft 60 of the reducing planetary gear mechanism 6 and is supported on the intermediate case 3 through a bearing 33. The output shaft 42 of the fluid coupling and the input shaft 60 of the reducing planetary gear mechanism are hollowed to provide an axial oil conduit 421 therethrough, which is fitted with a plug 420 and rotatably receives therein one end portion (the end closer to the engine) of a sleeve 422 which is fixedly mounted on the input shaft 51 of the V-belt stepless transmission.

The reducing planetary gear mechanism 6 is coupled with the input shaft 60 which is integrally connected to the output shaft 42 of the fluid coupling 4; and includes a carrier 62 which is connected through a multiple disk clutch 63 to a stationary flange of the V-belt stepless transmission as will be described hereinlater, a ring gear 66 which is engaged with the center case 3 through a multiple disk brake 65, a sun gear 67 provided around the outer periphery of the output shaft 61 of the reducing planetary gear mechanism which is formed integrally with the input shaft 51 of the V-belt stepless transmission, a planetary gear 64 which is meshed with the sun gear 67 and ring gear 66, a hydraulic servo 68 formed in the wall of the center case 3 to operate the multiple disk brake 65, and a hydraulic servo 69 formed in the above-mentioned stationary flange to operate the multiple disk clutch 63.

The V-belt type stepless transmission 5 includes; a stationary flange 52A formed integrally with the input shaft 51 which is in turn formed integrally with the output shaft of the reducing planetary gear machanism 6, an input pulley 52 constituted by a movable flange 52B which is driven toward the stationary flange 52A by the hydraulic servo 53, a stationary flange 56A which is formed integrally with the output shaft 55 of the V-belt stepless transmission, an output pulley 56 constituted by a movable flange 56B which is driven toward a stationary flange 56A by the hydraulic servo 57, and a V-belt 58 for transmitting power between the input and output pulleys 52 and 56.

The input shaft 51 of the V-belt stepless transmission is supported by the input shaft 60 of the reducing planetary gear mechanism through the bearing 34 at its end 51A on the side of the engine, which merges with the input shaft 61 of the reducing planetary gear mechanism, and by the center case 3 through the input shaft 60 of the reducing planetary gear mechanism and bearing 33. The other end 51B of the input shaft 51 is supported in the wall 25 of the transmission case on the side away from the engine, with its end face 51C abutted through a needle (or roller) bearing 27 against a lid 26 which is fastened to the transmission case wall 25.

A sleeve 422 is fitted in the axial oil conduit 511 of the input shaft 51 of the V-belt stepless transmission at its end 511A on the side of the engine to apply the oil pressure, which is supplied from the conduit 421 through the center case 3 and conduit 301, to the hydraulic servo 69 through an oil conduit 513 which is formed in the base portion of the stationary flange 52A. Fitted in the opposite end 511B of the oil conduit 511 is a pipe-like projection 261 of a lid 26 which is fitted to close a bore 25A formed in the side wall 25 of the transmission case 2 and internally provided with an oil conduit 514 in communication with the hydraulic control system to supply oil pressure to the hydraulic servo 53 through the projection 261 of the lid 26.

The helical output gear 59 is formed integrally with a hollow support shaft 591 which is, at the end 591A on the side of the engine, supported on the side wall of the torque converter case through a roller bearing 592 which provides one support point of the shaft. The other end 591B of the support shaft 591 is supported on the center case 3 through a roller bearing 593. One side face 59A of the helical output gear 59, which is located on the side of the engine, is abutted against the side wall of the torque converter case through a needle bearing 594 which forms an intermediate support point, while the opposite side 59B of the helical output gear is abutted against the side surface of the center case 3 through a needle bearing 595. The support shaft 591 is formed with an inner spline 596 on the side of the transmission.

The output shaft 55 of the V-belt type stepless transmission is formed with an outer spline 55A on the side of the engine for engagement with the inner spline 596 formed on the support shaft 591 of the helical output gear, and thus supported on the center case 3 through the support shaft 591 of the helical output gear by the spline fit. The other end 55B of the output shaft 55 is supported on the side wall of the transmission case, on the side remote from the engine, through a ball bearing 92 which forms another support point.

Oil conduit 551 which is formed axially through the output shaft 55 of the V-belt type stepless transmission assembly is fitted with a sensing valve body 552 at an intermediate position. As indicated at 55A, the sensing valve body 552 provided with a conduit on the side of the engine for applying the hydraulic servo 57 the oil pressure from the conduit 14 which is in communication with the hydraulic control system. The side 552B of the valve body 552, which is disposed on the side remote from the engine, is fitted in a pipe-like projection 554 of a lid 553 attached to the side wall 25 of the transmission case to close the bore 25B which is formed at a position opposing the output shaft 55, forming an oil conduit through the transmission case and the lid 553 fastened to the transmission case for supplying the operating oil from the hydraulic control system to the sensible valve 555 which detects the position of the movable flange 56B. With this arrangement, the second transmission shaft is formed by the spline fit of the support shaft 591 of the helical output gear 59 and the output shaft 55 of the V-belt stepless transmission assembly, so that, although it is important for one of the support points of the helical output gear 59 to be in axial alignment with the intermediate support point, a slight degree of misalignment of the axes of these support points with the axis of the output shaft 55 can be offset by the splined portion, facilitating the centering in the assembling stage of the manufacturing process.

As clear from the foregoing description, the stepless automatic transmission for motor vehicles according to the present invention includes: a first shaft coupled with the output shaft of an engine and rotatably supported by the automatic transmission case including a torque converter case accommodating a fluid joint, a transmission case fastened to the torque converter case and accommodating a V-belt type stepless transmission and a center case fastened in position between the torque converter case and the transmission case; a second shaft disposed parallel with the first shaft and supported by the automatic transmission case rotatably at three points on the torque converter case, transmission case and center case; and a third shaft disposed parallel with the second shaft and rotatably supported by the automatic transmission case, transmitting power between the first and second shafts by a V-belt type stepless transmission and between the second and third shafts by a helical output gear mounted on the second shaft and a helical input gear mounted on the third shaft in meshed engagement with the output gear: in which the second shaft is divided into an input section and an output section, and the helical output gear is mounted between the support points on the torque converter case and center case and rotatably gripped between the torque converter and center cases through a roller bearing. Owing to the provision of the second shaft which is divided into two parts and the roller bearing which supports the thrust force of the helical gears, it becomes possible to improve the durability of the ball bearing and to obviate the necessity for a high degree concentricity of the three support points of the second shaft, contributing to improve the productivity and to cut the production cost.

We claim:

1. In a stepless automatic transmission for motor vehicles, including an automatic transmission case, a first shaft coupled with the output shaft of an engine and rotatably supported by said automatic transmission case, said automatic transmission case including a torque converter case accommodating a fluid joint, said transmission case fastened to said torque converter case and accommodating a V-belt type stepless transmission, and a center case interposed between said torque converter and transmission cases; a second shaft disposed parallel with said first shaft and supported by said transmission case rotatably at three support points on said torque converter case, transmission case and center case; and a third shaft disposed parallel with said second shaft and rotatably supported by said automatic transmission case; transmitting power from said first to second shaft by said V-belt type stepless transmission and from the second to third shaft by meshed engagement of a helical output gear mounted on said second shaft and a helical input gear mounted on said third shaft:

said second shaft is divided into an input section and an output section, and said helical output gear is mounted between said support points on said torque converter and center case and rotatably gripped between said torque converter and center cases through a roller bearing.

* * * * *